US012790173B2

United States Patent
Ruhnke

(12) United States Patent

(10) Patent No.: US 12,790,173 B2

(45) Date of Patent: Nov. 10, 2026

(54) ELEVATOR SAFETY DEVICES

(71) Applicant: Otis Elevator Company, Farmington, CT (US)

(72) Inventor: Jan Ruhnke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1036 days.

(21) Appl. No.: 17/984,787

(22) Filed: Nov. 10, 2022

(65) Prior Publication Data

US 2024/0051791 A1 Feb. 15, 2024

(30) Foreign Application Priority Data

Aug. 15, 2022 (EP) .................................... 22190417

(51) Int. Cl.

*B66B 1/34* (2006.01)
*B66B 5/00* (2006.01)
*B66B 5/02* (2006.01)
*B66B 13/14* (2006.01)
*B66B 13/22* (2006.01)

(52) U.S. Cl.

CPC ............ *B66B 5/0018* (2013.01); *B66B 5/005* (2013.01); *B66B 5/02* (2013.01); *B66B 13/14* (2013.01); *B66B 13/22* (2013.01)

(58) Field of Classification Search

CPC ......... B66B 5/0018; B66B 5/005; B66B 5/02; B66B 13/14; B66B 13/22

USPC .......................................................... 187/393

See application file for complete search history.

(56) References Cited

U.S. PATENT DOCUMENTS 9,067,760 B2 * 6/2015 Bunter .................. B66B 5/0087
9,988,239 B2 * 6/2018 Toutaoui ............... B66B 5/0025
2012/0168258 A1 * 7/2012 Viita-Aho ............. B66B 5/0031 187/280
2013/0002192 A1 * 1/2013 Fischbach ................. H02J 7/04 320/162
2013/0081906 A1 * 4/2013 Studer ...................... B66B 13/22 187/325
2018/0215579 A1 * 8/2018 Knecht ................... B66B 13/22

FOREIGN PATENT DOCUMENTS

EP 3348508 A1 7/2018

OTHER PUBLICATIONS

European Search Report for application EP 22190417.0, dated Jan. 24, 2023, 52 pages.

* cited by examiner

*Primary Examiner* — Erick D Glass

(74) *Attorney, Agent, or Firm* — CANTOR COLBURN LLP

(57) ABSTRACT

An elevator safety device 16 for monitoring a landing door 10 of an elevator system 2. The elevator system 2 includes a landing door sensor 14 arranged to detect a state of the landing door 10. The elevator safety device 16 includes a power source 20 arranged to power the landing door sensor 14 independently of a power supply 19 of the elevator system 2 and a memory 22 arranged to record a state of the landing door 10 detected by the landing door sensor 14 when the landing door sensor 14 is powered by the power source 20.

13 Claims, 2 Drawing Sheets

ELEVATOR SAFETY DEVICES

FOREIGN PRIORITY

Figure 1:
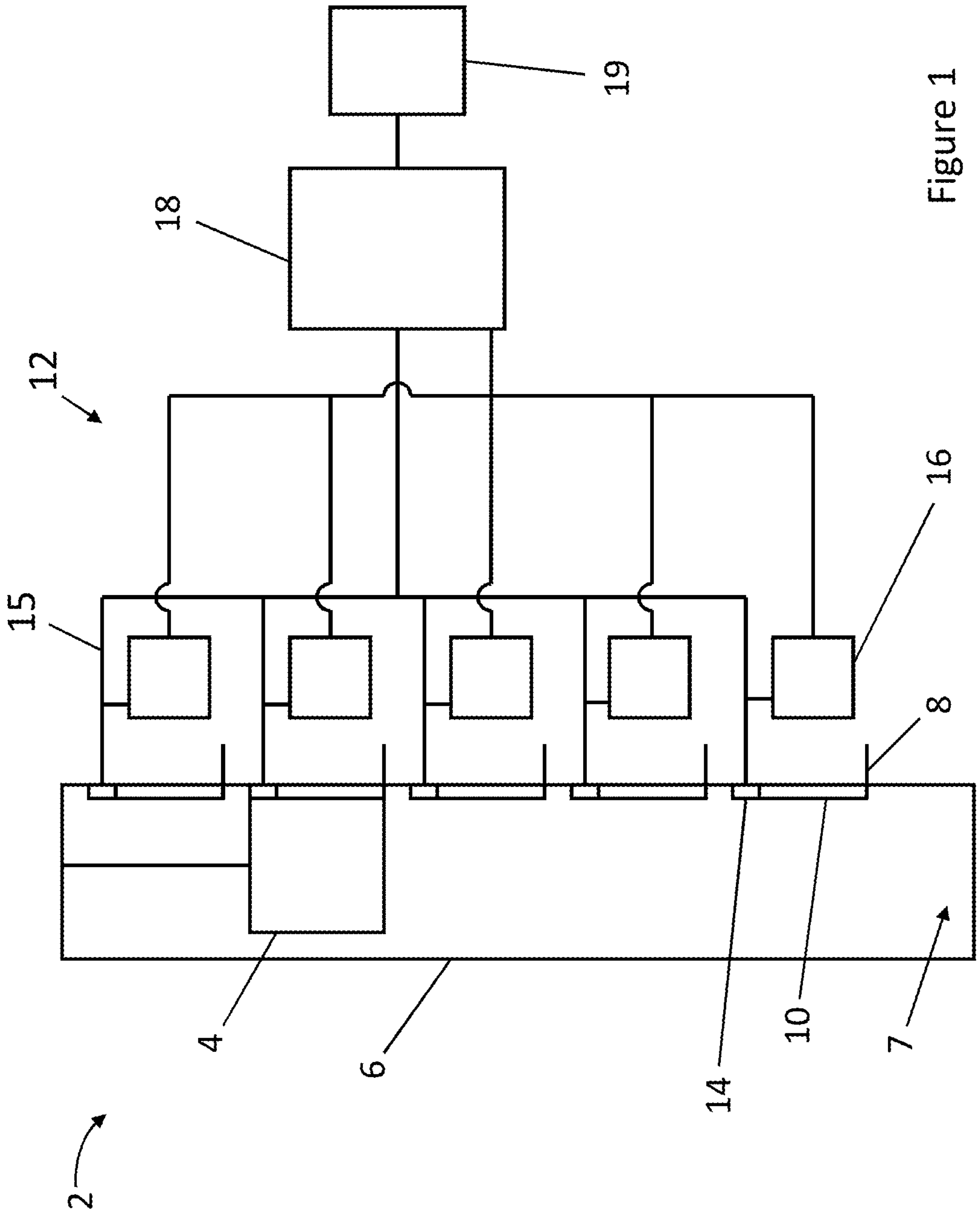

This application claims priority to European Patent Application No. 22190417.0, filed Aug. 15, 2022, and all the benefits accruing therefrom under 35 U.S.C. § 119, the contents of which in its entirety are herein incorporated by reference.

TECHNICAL FIELD

The present disclosure relates to elevator safety devices.

BACKGROUND

Elevator systems typically feature one or more elevator cars running in a hoistway to carry passengers or goods between floors of a building. Landing doors (sometimes also referred to as hoistway doors) on each landing provide access to the elevator car. The landing doors also provide access to the hoistway itself, e.g. for maintenance purposes. For instance, the lowest landing door might be used for accessing a pit area at the bottom of the hoistway.

Normally, elevator systems continually monitor the landing doors to detect if they are open or closed (e.g. with landing door switches). The elevator system may take appropriate safety action if a landing door is detected as being open at an unexpected time. For instance, if a lowest landing door is detected as being open without an adjacent elevator car, the system may presume that the pit area is being accessed by a technician and force the elevator car to operate in an inspection mode. This may limit the speed of operation of the car and/or limit movement into particular zones in the hoistway to ensure that the technician can work safely in the pit area. The technician, on leaving the pit area, then manually resets the safety system to allow a normal operational mode to resume.

However, it is not possible to monitor the landing doors if power to the elevator system is lost (e.g. during an unplanned power cut or planned down-time). Therefore, when power is restored, the elevator system must assume that the hoistway was entered whilst monitoring was unavailable, and takes corresponding safety action (e.g. activating an inspection mode). This must be then manually reset to allow for normal operation of the elevator. This can be inconvenient when the hoistway wasn't actually entered during the period without power. An improved approach may be desired.

SUMMARY

According to a first aspect of the present disclosure there is provided an elevator safety device for monitoring a landing door of an elevator system, the elevator system comprising a landing door sensor arranged to detect a state of the landing door, the elevator safety device comprising: a power source arranged to power the landing door sensor independently of a power supply of the elevator system; and a memory arranged to record a state of the landing door detected by the landing door sensor when the landing door sensor is powered by the power source.

The present disclosure extends to an elevator system comprising: a landing door; a landing door sensor arranged to detect a state of the landing door; a power supply arranged to power said elevator system; an elevator controller arranged to control the elevator system; and the elevator safety device as disclosed herein arranged to monitor said landing door.

It will be recognised by those skilled in the art that the elevator safety device can provide improved monitoring of the landing door, because the landing door sensor can be powered with the power source when the power supply of the elevator system is unavailable. This allows, for instance, the state of the landing door to be monitored during an interruption to the elevator system's power supply, and for information about said state to be read from the memory once the interruption is over. For example, if the memory indicates that the landing door was not opened during an interruption to the elevator system's power supply, the elevator system can deduce that no-one has accessed the hoistway during the interruption and that full operational mode can be resumed immediately, without requiring manual intervention.

Moreover, the elevator safety device may be simple to retrofit to existing elevator systems, because it can utilise an existing landing door sensor. For instance, the elevator safety device may simply be connected to the landing door sensor in parallel with an existing landing door sensing circuit.

The elevator safety device may be arranged to power the landing door sensor using the power source when the power supply of the elevator system is interrupted, e.g. during a power cut or during planned downtime. This may ensure that the landing door continues to be monitored even when the power supply of the elevator system is unavailable.

The elevator safety device may be arranged to begin to power the landing door sensor using the power source in response to an interruption to the power supply of the elevator system (e.g. in response to a signal indicating the interruption of the power supply). The elevator safety device may be arranged to monitor the power supply of the elevator system. The elevator safety device may be arranged to automatically power the landing door sensor using the power source when an interruption to the power supply of the elevator system is detected.

The elevator safety device may be arranged to disconnect the landing door sensor from the power source when the power supply of the elevator system is active (e.g. when the power supply is reactivated after an interruption). Disconnecting the power source from the landing door sensor when the elevator system power supply is active may reduce redundant use of energy from the power source and may mitigate interference with an existing landing door sensing circuit. In a set of examples, the elevator safety device comprises a switching arrangement (e.g. a relay) that is arranged to controllably connect the power source to the landing door sensor.

The power supply may be the main power supply of the elevator system, e.g. that is used to power the movement of one or more elevator cars in the hoistway between landings.

The power source may be arranged to power only the landing door sensor and the elevator safety device itself. This may allow the use of a relatively low cost and low size power source. In a set of examples, the power source comprises a battery, a capacitor or a supercapacitor. The power source may have an energy capacity of less than 5 Wh, less than 1 Wh or less than 0.5 Wh. The elevator safety device may be arranged to recharge the power source using the power supply of the elevator system.

The elevator safety device may be arranged to communicate with an elevator controller of the elevator system, e.g. to report the recorded state of the landing door to an elevator controller. The elevator safety device may be arranged to report the state of the landing door recorded by the memory to the elevator controller following (e g immediately following) an interruption to the power supply of the elevator system.

The elevator controller may be arranged to control the elevator system according to the state of the landing door recorded by the memory. For instance, the elevator controller may be arranged to perform a safety action (e.g. to initiate an inspection mode) if the memory indicates that landing door has been opened. The elevator controller may be arranged to initiate a normal operational mode if the memory indicates that the landing door has not been opened.

In a set of examples, the elevator safety device comprises a microcontroller. The microcontroller may be arranged to communicate with an elevator controller of the elevator system. The microcontroller may be arranged to read from the memory and/or to reset the memory. The microcontroller may be arranged to act as an interface between the memory and an elevator controller. The microcontroller may be arranged to control the connection of the power source to the landing door sensor. For instance, in examples featuring a switching arrangement arranged to controllably connect the power source to the landing door sensor, the microcontroller may be arranged to control the switching arrangement. In some examples, one or more of these functions may be performed directly by an elevator controller. For instance, the memory may be arranged to be directly readable and/or resettable by an elevator controller. However, it may be beneficial to use a microcontroller as part of the elevator safety device (e.g. located physically remotely from the elevator controller) to simplify installation.

The memory can be very small. For instance the memory may comprise 32 bits of data storage or less, e.g. 16 bits or 8 bits. In some examples the memory is arranged to record a single data point, e.g. a single data point that indicates if the landing door has opened at any point since the memory was last reset. The memory may even consist of a 1-bit data storage element (i.e. a latch) arranged to change state if the landing door sensor detects an open landing door. A small memory may have a low cost and be simple to implement, whilst still recording sufficient information to allow the elevator system to determine if the landing door has been open at any point during a power interruption. Whilst such a small memory may not be able to log detailed information about landing door activity this may not be needed to avoid many unnecessary manual resets (i.e. when there is no landing door activity during an interruption). Of course in some examples, the memory is arranged to record additional information, for instance to record a log of changes in the state of the landing door (e.g. a time-stamped log of landing door events).

The memory may comprise any computer memory suitable for recording a state of the landing door. Preferably, the memory comprises a non-volatile memory, e.g. EEPROM or flash memory. The memory may comprise a data buffer such as a first-in-first-out (FIFO) memory. The memory may comprise a hardware register. The elevator safety device (e.g. a microcontroller of the elevator safety device) may be arranged to erase or reset the memory. For instance, the elevator safety device may be arranged to erase or reset the memory when starting to power the landing door sensor with the power source (e.g. when the power supply of the elevator system is interrupted). In some examples the elevator safety device may be arranged such that the memory is erasable or resettable directly by the elevator controller.

The landing door sensor may comprise any landing door sensor known in the art per se. In a set of examples, the landing door sensor comprises a switch which completes an electrical connection between a first electrical terminal and a second electrical terminal when the landing door is closed, and which breaks said electrical connection when the door is open (or vice versa). The landing door sensor may comprise a contact switch (e.g. a pair of electrical contacts coupled to respective parts of the landing door and arranged to be brought into/out of electrical contact with the opening/closing of the door). Alternatively, the landing door sensor may comprise a non-contact switch such as a reed switch.

The power source may be arranged to be connected in series with the landing door sensor. For instance, in examples where the landing door sensor comprises a switch, the power source may be arranged to be connected in series with the switch (e.g. connected to a first terminal of the switch). The elevator safety device may be arranged to supply an electrical current to the switch (e.g. by connecting the switch to the power source). The elevator safety device may be arranged to supply direct current (DC) or alternating current (AC) to the switch. For instance, in a set of examples the elevator safety device may be arranged to apply a fixed (for DC) or changing (for AC) voltage to the first terminal of the switch and to monitor a voltage on the second terminal of the switch.

The elevator safety device may comprise a power converter (e.g. comprising a voltage regulator, a rectifier, an inverter or a switched-mode power supply) arranged to generate the fixed or changing voltage from the power source. The elevator safety device may comprise a sensing circuit portion arranged to sense a voltage on the second terminal of the switch.

The presence or absence of the fixed or changing voltage at the second terminal may indicate the state of the switch and, accordingly, the state of the landing door. The elevator safety device can thus deduce the state of the landing door (and record this to the memory) simply by monitoring the second terminal. Moreover, in some examples in which the elevator safety device supplies a changing voltage (AC) to the first terminal, the voltage at the second terminal may be monitored and analysed to determine the state of the landing door and/or additional information about the elevator safety device or the landing door sensor. For instance, patterns in the resulting AC voltages at the second terminal may be analysed to detect not only the state of the switch but also to detect faults or issues with the switch or associated circuitry such as connecting cables.

The memory may be arranged to be connected in series with the landing door sensor. For instance, in examples where the landing door sensor comprises a switch, the memory may be arranged to be connected in series with the switch (e.g. connected to a second terminal of the switch). This may allow for a particularly simple implementation of the elevator safety circuit. For instance, the elevator safety device may be arranged to supply a DC voltage to the first terminal of the switch, such that the DC voltage on the second terminal is indicative of the state of the landing door. In such an example the DC voltage on the second terminal may be used as a direct data input to the memory to allow the memory to record the state of the landing door (e.g. a sensing circuit portion may not be required).

The landing door sensor may comprise a dedicated landing door sensor (i.e. a landing door sensor used primarily or exclusively by the elevator safety device). The landing door sensor may comprise part of the elevator safety device. However, in some examples, the landing door sensor comprises an existing landing door sensor of the elevator system, i.e. the elevator safety device is arranged to connect to an existing landing door sensor.

In a set of examples, the elevator controller is arranged to receive information from the landing door sensor independently of the elevator safety device. For instance, the elevator system may comprise a landing door sensing circuit arranged to connect the landing door sensor to the elevator controller independently of the elevator safety device. The landing door sensing circuit may be connected to the landing door sensor in parallel with the elevator safety device.

The elevator controller may be arranged to control the elevator system according to information received from the landing door sensor (e.g. a state of the landing door detected by the landing door sensor) independently of the elevator safety device. For instance, the elevator controller may be arranged to perform a safety action (e.g. initiating inspection mode) if information received from the landing door sensor independently of the elevator safety device indicates that the landing door is open at an unexpected time. The elevator system may be arranged to power the landing door sensor using the power supply of the elevator system.

Elevator systems typically include several landing doors (e.g. for accessing several floors in a building). Accordingly, the elevator system may comprise a plurality of landing doors. The elevator system may comprise a corresponding plurality of landing door sensors, with each landing door sensor arranged to detect a state of a respective landing door.

The elevator safety device may be arranged to monitor a single landing door. The elevator safety device may comprise a single physical device located in close proximity to the landing door it monitors (e.g. less than 5 m away or less than 2 m away). A plurality of elevator safety devices may be provided for a respective plurality of landing doors in an elevator system. The elevator system may comprise a plurality of elevator safety devices as disclosed herein, with the power source of each elevator safety device arranged to power a respective landing door sensor independently of a power supply of the elevator system and the memory of each elevator safety device arranged to record a state of the landing door detected by the respective landing door sensor when the landing door sensor is powered by the power source. Providing an elevator safety device for a plurality of landing doors in an elevator system (e.g. for every landing door in an elevator system) allows information on the states of all of the landing doors to be gathered during an interruption to the power supply of the elevator system.

In some examples, the elevator safety device may be arranged to monitor a plurality of landing doors. For instance, the power source may be arranged to power a plurality of landing door sensors independently of a power supply of the elevator system, wherein each landing door sensor is arranged to detect a state of a respective landing door. The memory may be arranged to record states of some or all of the plurality of landing doors detected by the landing door sensors when the landing door sensors are powered by the power source. In some examples the elevator safety device comprises a plurality of memories arranged to record respective states of a plurality of landing doors.

More generally, the elevator system may comprise a first elevator safety device arranged to monitor a first set of landing doors and a second elevator safety device arranged to monitor a second set of landing doors. The first and second sets may be of different sizes and may each contain one or more landing doors. For instance, the first elevator safety device may be arranged to monitor only a lowest landing door (e.g. used for accessing a pit area) and the second elevator safety device may be arranged to monitor some or all of the other landing doors.

The elevator safety device may comprise a single physical device, e.g. with power and/or data terminals for connecting the elevator safety device to the landing door sensor and/or the elevator system. The elevator safety device may be integrated with other elevator circuitry, e.g. other door or pit safety devices. For instance, components making up the elevator safety device may be included on a single circuit board with components for other functions. The elevator safety device may be small enough to be installed with inside existing landing door sensor circuitry. For instance, the elevator safety device (or a larger device such as a circuit board which includes components making up the elevator safety device) may have a maximum dimension of less than 0.5 m, less than 0.1 m or less than 0.05 m. The elevator safety device may have an area footprint of less than 0.25 $m^2$, less than 0.01 m 2 or less than 0.0025 $m^2$. The elevator safety device may take up a volume of less than 0.125 $m^3$, less than 0.001 m 3 or less than 0.000125 $m^3$.

Features of any aspect or example described herein may, wherever appropriate, be applied to any other aspect or example described herein. Where reference is made to different examples, it should be understood that these are not necessarily distinct but may overlap.

DRAWING DESCRIPTION

Figure 2:
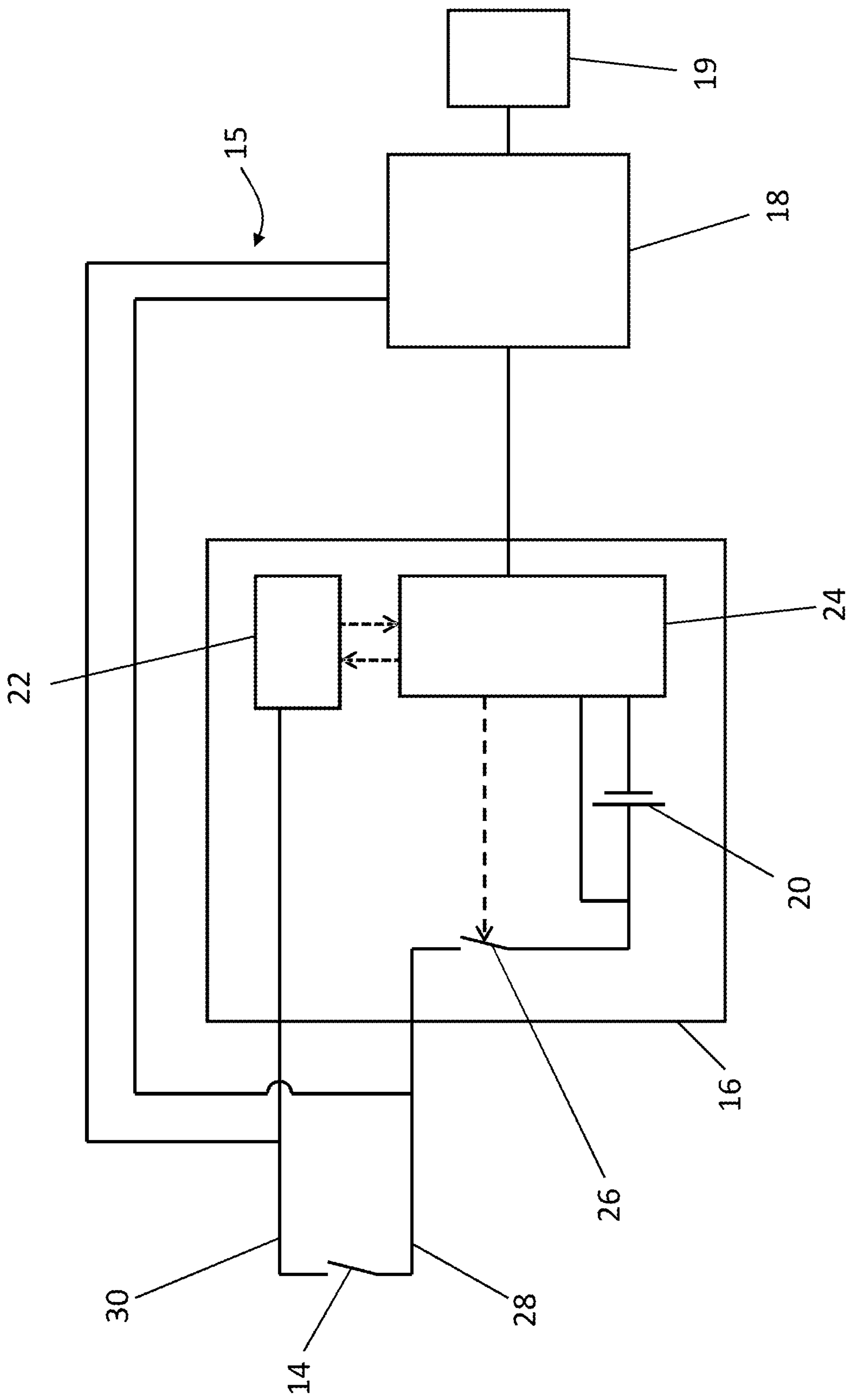

One or more non-limiting examples will now be described, by way of example only, and with reference to the accompanying figures in which:

FIG. 1 is a schematic view of an elevator system according to an example of the present disclosure; and FIG. 2 is a schematic view of part of the elevator safety system of the elevator system shown in FIG. 1.

DETAILED DESCRIPTION

As shown in FIG. 1, an elevator system 2 comprises an elevator car 4 that travels in a hoistway 6 to transport passengers and/or cargo between landings 8 in a building. The hoistway 6 comprises a pit area 7 below the lowest landing 8.

Each landing 8 features a landing door 10, which allows access to the elevator car 4 when it is adjacent the landing 8, and to the hoistway 6 itself when the elevator car 4 is not adjacent the landing 8.

The elevator system 2 comprises an elevator safety system 12, comprising a plurality of landing door switches 14, a plurality of elevator safety devices 16 and an elevator controller 18. Each landing door switch 14 detects whether a corresponding landing door 10 is open or closed. The elevator controller 18 is connected to the landing door switches 14 via a landing door sensing circuit 15. The elevator system 2 is powered by a power supply 19.

FIG. 2 shows part of the elevator safety system 12 in more detail. FIG. 2 shows one of the landing door switches 14, an elevator safety device 16 and the elevator controller 18. The landing door switch 14 completes an electrical connection between a first electrical terminal 28 and a second electrical terminal 30 when the landing door 10 is closed, and breaks said electrical connection when the landing door 10 is open.

The elevator safety device 16 comprises a battery 20, a non-volatile memory 22 and a microcontroller 24. The battery 20 is connected to the first terminal 28 of the landing door switch 14 via a switch 26. The non-volatile memory 22 is connected to the second terminal 30 of the landing door switch 14. The microcontroller 24 is powered by the battery 20 and is in communication with the elevator controller 18.

During normal operation, the elevator car 4 moves between the landings 8 carrying passengers and/or cargo. It may occasionally be necessary to access the hoistway 6. For instance, an elevator technician may wish to access the pit area 7 of the hoistway 6 to perform a maintenance operation. To do so, the technician opens the lowest landing door 10 whilst the elevator car 4 is elsewhere and climbs into the pit area 7.

The elevator controller 18 detects that the lowest landing door 10 is open based on a signal from the lowest landing door switch 14 (via the landing door sensing circuit 15). The elevator car 4 is not adjacent that landing door 10, so the elevator controller 18 activates an inspection mode which limits the speed of operation of the elevator car 4 and prevents the elevator car 4 from moving into the pit area 7. This ensures that the technician can perform the maintenance operation in the pit area 7 safely. When the technician leaves the pit area 7, they manually indicate to the elevator controller 18 that they have left the hoistway 6, and normal operation is resumed.

If the elevator system 2 loses power (e.g. due to an unplanned power cut or an unplanned power outage), the elevator controller 18 can no longer actively monitor the state of the landing doors 10 via the landing door sensing circuit 15. Therefore, the microcontroller 24 monitors the power supply 19 (e.g. via the elevator controller 18) and when the microcontroller 24 detects an interruption in the power supply 19 it resets the memory 22 and closes the switch 26, connecting the battery 20 to the landing door switch 14. A small direct current flows through the landing door switch 14.

If the landing door switch 14 opens (i.e. if the corresponding landing door 10 opens) whilst the power supply 19 is interrupted (i.e. whilst the battery 20 is connected to power the landing door switch 14), the direct current through the switch 14 is interrupted. This causes the non-volatile memory 22 to record that the landing door 10 has been opened. For instance, the non-volatile memory 22 may record a single data point that the door has been opened since the memory 22 was last reset.

When power to the elevator system 2 is restored, the microcontroller 24 reads the contents of the non-volatile memory 22 and sends it to the elevator controller 18. This happens for all of the elevator safety devices 16. The elevator controller 18 is thus informed if any of the landing doors 10 were opened whilst the power supply 19 was interrupted. If the contents of the memories 22 indicate that any of the landing doors 10 were opened during the interruption of the power supply 19, the elevator controller 18 restarts operation of the elevator system 2 in the inspection mode. However, if the memories 22 indicate that none of the landing doors 10 were opened during the interruption, the elevator controller 18 activates full operation mode immediately without needing any manual input.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed:

1. An elevator safety device (16) for monitoring a landing door (10) of an elevator system (2), the elevator system (2) comprising a landing door sensor (14) arranged to detect a state of the landing door (10), the elevator safety device (16) comprising:

a power source (20) arranged to power the landing door sensor (14) independently of a power supply (19) of the elevator system (2); and a memory (22) arranged to record a state of the landing door (10) detected by the landing door sensor (14) when the landing door sensor (14) is powered by the power source (20);

wherein the landing door sensor (14) comprises a switch which completes an electrical connection between a first electrical terminal (28) and a second electrical terminal (30) when the landing door (10) is closed, and which breaks said electrical connection when the landing door (10) is open; and the power source (20) is arranged to be connected to the first terminal (28); and the memory (22) is arranged to be connected to the second terminal (30).

2. The elevator safety device (16) of claim 1, arranged to power the landing door sensor (14) using the power source (20) when the power supply (19) of the elevator system (2) is interrupted and to disconnect the landing door sensor (14) from the power source (20) when the power supply (19) of the elevator system (2) is active.

3. The elevator safety device (16) of claim 1, wherein the power source (20) comprises a battery, a capacitor or a supercapacitor.

4. The elevator safety device (16) of claim 1, arranged to report the recorded state of the landing door (10) to an elevator controller (18) of the elevator system (2) following an interruption to the power supply (19) of the elevator system (2).

5. The elevator safety device (16) of claim 4, comprising a microcontroller (24) arranged to act as an interface between the memory (22) and the elevator controller (18).

6. The elevator safety device (16) of claim 1, wherein the memory (22) is arranged to record a single data point that indicates if the landing door (10) has opened at any point since the memory (22) was last reset.

7. The elevator safety device (16) of claim 1, wherein the memory (22) comprises a non-volatile memory.

8. The elevator safety device (16) of claim 1, wherein the power source (20) is arranged to be connected in series with the landing door sensor (14).

9. The elevator safety device (16) of claim 1, wherein the memory (22) is arranged to be connected in series with the landing door sensor (14).

10. An elevator system (2) comprising:

a landing door (10);

a landing door sensor (14) arranged to detect a state of the landing door (10);

a power supply (19) arranged to power said elevator system (2);

an elevator controller (18) arranged to control the elevator system (2); and an elevator safety device (16) arranged to monitor said landing door (10) and including:

a power source (20) arranged to power the landing door sensor (14) independently of a power supply (19) of the elevator system (2); and a memory (22) arranged to record a state of the landing door (10) detected by the landing door sensor (14) when the landing door sensor (14) is powered by the power source (20);

wherein the elevator controller (18) is arranged to control the elevator system (2) according to the state of the landing door (10) recorded by the memory (22); and wherein the elevator controller (18) is arranged to receive information from the landing door sensor (14) independently of the elevator safety device (16), and to control the elevator system (2) according to information received from the landing door sensor (14) independently of the elevator safety device (16).

11. The elevator system (2) of claim 10, wherein the elevator controller (18) is arranged to initiate an inspection mode if the memory (22) indicates that landing door (10) has been opened and to initiate a normal operational mode if the memory (22) indicates that the landing door (10) has not been opened.

12. The elevator system (2) of claim 10, wherein:

the landing door sensor (16) comprises a switch (16) which completes an electrical connection between a first electrical terminal (28) and a second electrical terminal (30) when the landing door (10) is closed, and which breaks said electrical connection when the landing door (10) is open; and the power source (20) is arranged to be connected to the first terminal (28) of the switch (16); and the memory (22) is arranged to be connected to the second terminal of the switch (16).

13. The elevator system (2) of claim 10, comprising:

a plurality of landing doors (10);

a plurality of landing door sensors (14), each landing door sensor (14) being arranged to detect a state of a respective landing door (10); and a first elevator safety device (16) arranged to monitor a first set of the landing doors (10) and a second elevator safety device (16) arranged to monitor a second set of the landing doors (10).

* * * * *